United States Patent [19]

Ohya et al.

[11] Patent Number: 4,600,616
[45] Date of Patent: Jul. 15, 1986

[54] HEAT-SHRINKABLE LAMINATE FILM
[75] Inventors: Masaki Ohya; Yoshiharu Nishimoto, both of Iwaki, Japan
[73] Assignee: Kureha Kagaku Kogyo Kabushiki Kaisha, Tokyo, Japan
[21] Appl. No.: 667,349
[22] Filed: Nov. 1, 1984
[30] Foreign Application Priority Data
  Nov. 1, 1983 [JP] Japan ................ 58-205461
[51] Int. Cl.$^4$ ............ B32B 27/08; B32B 33/00; B32B 31/30
[52] U.S. Cl. ............ 428/36; 428/216; 428/516; 428/518; 428/913; 426/127; 264/173; 264/209.1
[58] Field of Search ........... 428/35, 36, 216, 913, 428/516, 518
[56] References Cited
  U.S. PATENT DOCUMENTS
  4,197,326  4/1980  Wakamatsu et al. ........ 428/483 X
  4,226,822 10/1980  Yoshikawa et al. ........ 264/173
  4,424,243  1/1984  Nishimoto et al. ........ 428/36

FOREIGN PATENT DOCUMENTS
  0032027  7/1981  European Pat. Off. .
  0092897 11/1983  European Pat. Off. .

Primary Examiner—P. C. Ives
Attorney, Agent, or Firm—Oblon, Fisher, Spivak, McClelland & Maier

[57] ABSTRACT

Disclosed herein is a heat-shrinkable laminate film comprising outer layers of a polyolefin, a gas-barrier layer of a copolymer of vinylidene chloride, at least one intermediate layer of an ionomer and adhesive layers disposed between any of the above layers, the total thickness of the intermediate layer(s) of an ionomer being 5 to 20% of the total thickness of the heat-shrinkable laminate film.

The heat-shrinkable laminate film is particularly useful in packaging foodstuffs.

4 Claims, No Drawings

HEAT-SHRINKABLE LAMINATE FILM

BACKGROUND OF THE INVENTION

The present invention relates to a heat-shrinkable laminate film showing an adequate rigidity and a favorable stretchability, which comprises outer layers of a polyolefin, a gas-barrier layer of a copolymer of vinylidene chloride (hereinafter referred to as VDC), at least one intermediate layer of an ionomer and adhesive layers disposed between any of the above layers, the total thickness of the intermediate layer(s) of an ionomer being 5 to 20% of the total thickness of the heat-shrinkable laminate film.

For packaging foodstuffs of non-uniform and irregular shapes, a method of heat-shrink packaging (also called the skin-packaging) while using a heat-shrinkable packaging material is generally applied, and since it is demanded to preserve the thus packaged foodstuff sanitarily for a long time period, it is necessary that the packaging material used for that purpose is impermeable to gases, particularly to gaseous oxygen, in other words, the packaging material must have gas-barrier property.

As the heat-shrinkable gas-barrier material, as has been well known, a single film of a VDC has been utilized.

However, because of the poor mechanical properties of the single film of a VDC at lower temperatures, a laminate film comprising outer layers of a polyolefin and a gas-barrier layer of a VDC has been developed. For instance, Japanese Patent Application Laying-Open No. 58-128821 (1983) discloses a laminate film comprising outer layers of a copolymer of ethylene and vinyl acetate and a gas-barrier layer of a VDC, and the thus disclosed film has solved the problem, however, since the rigidity of the thus disclosed film is somewhat insufficient, the laminate film cannot exhibit a satisfactory operational processability in packaging foodstuffs.

For improving the rigidity of the laminate film, an utilization of a layer of an ionomer has been proposed. For instance, U.S. Pat. No. 4,226,822 discloses a laminate film of a total thickness of 35 to 90 μm, which comprises at least one of the outer layers of an ionomer of 20 to 50 μm in thickness, two adhesive layers and a gas-barrier layer of a VDC.

Although the thus disclosed laminate film shows an adequate rigidity and accordingly, exhibits a satisfactory operational processability in packaging foodstuff, in the case where a laminate film is prepared in a tubular form while having the ionomer layer as the outer layer of the tubular film, because of the hydrophilicity of the ionomer, the outer layer of the ionomer is whitened by water attached in the quenching step. The thus whitened outer layer deteriorates the appearance of the film itself and also the packaged foodstuffs. Also in the case where the innermost layer of the tubular form is the ionomer, the ionomer layer to be sealed when the foodstuff is packaged is required to have a certain extent thickness. As a result, such a heat-shrinkable laminate film tends to become rigid and to lose flexibility and accordingly the heat-shrinkable laminate film is not suitable for a large amount of foodstuff. These demerits remain as far as the ionomer layer is used as the outer layer or inner layer of the tubular form of the laminate film.

In consideration of the merits and demerits of the use of an ionomer layer, the present inventors have tried to prepare a heat-shrinkable laminate film having at least one ionomer layer not as the outer layer (or the inner layer) but as the intermediate layer, and have attained to the present invention.

Namely, the heat-shrinkable laminate film according to the present invention comprises outer layers of flat sheet form or the outer layer and the inner layer of tubular form of a polyolefin, a gas-barrier layer of a VDC, at least one intermediate layer of an ionomer and adhesive layers disposed between any two of the layers, the total thickness of the intermediate layer(s) of the ionomer being 5 to 20% of the total thickness of the heat-shrinkable laminate film.

Because of the presence of at least one ionomer layer of a specified thickness between the outer layer of a polyolefin and the gas-barrier layer of a VDC, the heat-shrinkable laminate film according to the present invention shows an adequate rigidity, thereby overcoming the difficulty due to elongation of the film by the weight of the article to be packaged in packaging operation, and a more uniform stretchability than that of the film disclosed in Japanese Patent Application Laying-Open No. 58-128821 (1983). The laminate film according to the present invention is heat-shrinkable, impermeable to gaseous oxygen and free from whitening.

SUMMARY OF THE INVENTION

In an aspect of the present invention, there is provided a heat-shrinkable laminate film comprising outer layers of a polyolefin, a gas-barrier layer of a copolymer of vinylidene chloride, at least one intermediate layer of an ionomer and adhesive layers disposed between any of the above layers, the total thickness of the intermediate layer(s) of an ionomer being 5 to 20% of the total thickness of the heat-shrinkable laminate film.

DETAILED DESCRIPTION OF THE INVENTION

The VDC used for preparing the gas-barrier layer of the heat-shrinkable laminate film according to the present invention comprises a copolymer of from 65 to 95% by weight of vinylidene chloride and from 35 to 5% by weight of at least one comonomer copolymerizable with vinylidene chloride. As the comonomer copolymerizable with vinylidene chloride, for instance, vinyl chloride, acrylonitrile and $C_1$ to $C_{18}$-alkyl acrylates may be mentioned, and among these comonomers, vinyl chloride is preferably used for producing the copolymer. The VDC may contain a small amount of plasticizer(s) and stabilizer(s) according to the necessity. These additives, i.e., the plasticizers and the stabilizers, used in the present invention have been known by the persons skilled in the art, and represented by, for instance, dioctyl adipate and epoxidized soy bean oil.

As the polyolefin used for preparing each of the outer layers, for instance, high density polyethylenes, moderate density polyethylene, low density polyethylene, copolymers of ethylene and vinyl acetate (hereinafter referred to as EVA), copolymers of ethylene and an ester of acrylic acid copolymer of ethylene and propylene, polypropylene, copolymers of ethylene and an α-olefin (so-called linear low density polyethylene, hereinafter referred to as LLDPE) and mixtures of the above-mentioned polymers and copolymers may be mentioned.

The preferable constructional modes of one or both of the outer layers from the viewpoint of stretchability of the layer(s) by using the above-mentioned olefin resins are as follows.

(i) Both the outer layers are prepared by using EVA of a crystal melting point of from 80° to 103° C.

(ii) One of the outer layers is prepared by using the EVA of a crystal melting point of 80° to 103° C., and the other of the outer layers is prepared by using LLDPE of a crystal melting point of from 110° to 130° C.

(iii) One of the outer layers is prepared by using the EVA of a crystal melting point of 80° to 103° C., and the other of the outer layers is prepared by using a mixture of not more than 40% by weight of the LLDPE of a crystal melting point of 110° to 130° C. and not less than 60% by weight of the EVA of a crystal melting point of 80° to 103° C.

(iv) Both the outer layers is prepared by using the mixture of not more than 40% by weight of LLDPE of a crystal melting point of 110° to 130° C. and not less than 60% by weight of the EVA of a crystal melting point of 80° to 103° C.

Of the above-mentioned four modes, (i), (ii) and (iii) are preferable, particularly (i) is more preferable, from the viewpoint of transparency of the thus prepared layer(s).

The above-mentioned crystal melting point of EVA or LLDPE is the temperature at which the value on the melting curve obtained by observing the melting phenomenon of the specimen while using a scanning differential calorimeter becomes the maximum.

In addition, the total thickness of the layer(s) prepared by using the polyolefin is in a range of from 35 to 92% of the total thickness of the heat-shrinkable laminate film according to the present invention.

The use of at least one ionomer layer as the intermediate layer(s) of the heat-shrinkable laminate film is the main characteristic feature of the heat-shrinkable laminate film according to the present invention, and by disposing the layer(s) of an ionomer of an adequate rigidity and a favorable stretchability as intermediate layer, the stretchability and the rigidity of the laminate film comprising a VDC layer and the polyolefin layer(s) have been improved.

The laminate film disposed each of two ionomer layers as intermediate layer between each of two outer layer of polyolefin and a core layer of VDC through the adhesive layers is preferable.

The ionomer used in preparing the heat-shrinkable laminate film according to the present invention is an ionic copolymer provided with ionic linkage(s) therewithin, and is obtained by completely or partially neutralizing a copolymer of an α-olefin such as ethylene and an unsaturated carboxylic acid such as acrylic acid and methacrylic acid by an alkali metal or zinc.

In the heat-shrinkable laminate film according to the present invention, the total thickness of the ionomer layer(s) is 5 to 20% of the total thickness of the heat-shrinkable laminate film according to the present invention. In the case where the total thickness of the ionomer layer(s) is below 5% of the total thickness of the heat-shrinkable laminate film, the ionomer layer(s) does not contribute the stretchability and rigidity of the heat-shrinkable laminate film. On the other hand, in the case of over 20%, the rigidity of the thus produced film is too large resulting in the reduced impact strength of the film. Although it is possible to improve the operational processability of the laminate film generally by the improvement of the rigidity of the film, in the case of using a laminate film of too large in rigidity, the edge of the sealed portion of the laminate film becomes too hard after packaging an article with the laminate film and heat-shrinking the thus packaged film containing the article, and in addition, the whole laminate film after finishing the packaging operation becomes too brittle causing the reduction of impact strength, which becomes the cause of breakage of packaging during transportation.

As the preferable material for preparing the adhesive layer, EVA containing 13 to 28% by weight of vinyl acetate units, copolymers of ethylene and an ester of acrylic acid containing 13 to 28% by weight of the ester of acrylic acid units, the products obtained by modifying each of the above-mentioned copolymers with an unsaturated carboxylic acid and the products obtained by further modifying the thus modified copolymer with a metal may be exemplified. Of these materials, those copolymers of ethylene and an ester of acrylic acid, the products obtained by modifying thereof with the unsaturated carboxylic acid and the products obtained by further modifying the thus modified product with the metal are more preferable. As has been mentioned above, each of the adhesive layers is disposed between the polyolefin layer and the VDC layer, between the VDC layer and the ionomer layer and between the ionomer layer and the polyolefin layer. The thickness of the adhesive layer is preferably in a range of from 0.5 to 3 μm.

The heat-shrinkable laminate film according to the present invention is constructed by the above-mentioned layers, and the total thickness thereof is preferably in a range of from 20 to 120 μm.

The configuration of the heat-shrinkable laminate film according to the present invention is a flat sheet form or a tubular form.

In the case of preparing the heat-shrinkable laminate film in a flat sheet form, each unit layer which will construct the laminate film is extruded from each of the number of extruders corresponding to the number of resins constructing the laminate film through each of the known T-dies of the extruders, and the thus extruded unit layers are laminated together to be a laminate film within the die. Thereafter, the thus obtained laminate film is biaxially stretched by a tentor to be a heat-shrinkable laminate film of a flat sheet form according to the present invention.

On the other hand, in the case of preparing the heat-shrinkable laminate film of a tubular form according to the present invention, a number of the resins each of which will construct each of the layers are coextruded from a common annular die connected to the number of extruders corresponding to the number of the resins constructing the laminate film, in a shape of multi-layered tubular form. Thereafter, the thus obtained, multi-layered tubular film is subjected to a conventional biaxial inflation to be a heat-shrinkable laminate film in a tubular form according to the present invention.

The thus obtained heat-shrinkable laminate film is excellent in stretchability and gas-barriering property, and shows an adequate rigidity, and accordingly, it is used in particular suitably for packaging foodstuffs.

The heat-shrinkable laminate film according to the present invention will be explained more in detail while referring to the following non-limitative examples.

EXAMPLES 1 TO 4 AND COMPARATIVE EXAMPLES 1 TO 2

Preparation of a heat-shrinkable laminate film in a tubular form according to the present invention The VDC, the adhesive resin, the ionomer and the polyolefin, respectively shown in Table 1 were melt-extruded respectively from a number of extruders corresponding to the number of resins which construct the heat-shrinkable laminate film to be prepared according to the present invention, and supplied to a common circular die. The thus supplied molten resins were extruded from the die in a form of a multi-layered tubular material and cooled in a cooling bath to be a multi-layered tubular material of 120 mm in folded width and 540 μm in thickness having a small amount of soy-bean oil introduced into the central tubular space for preventing the adherence of the inner layer when folded. The thus cooled, multi-layered tubular material was heated for about 12 sec while transferring the tubular material through a hot water bath at a temperature shown in Table 1-2 at a transferring speed of 20 m/min. Then, the thus heated tubular material was stretched between the first pair or nip rolls rotating at a speed of 20 m/min and the second pair of nip rolls rotating at a speed of 60 m/min into the longitudinal direction at a stretch ratio of 3 (i.e. 60/20=3) while simultaneously being stretched into the diametrical direction 3 times by an air supplied into the central tubular space thereof. During the above-mentioned biaxial stretching, air at room temperature was blown onto the external surface of the tubular material to cool the tubular material to room temperature. The thus obtained, folded multi-layered tubular material was about 350 mm in folded width and 60 μm in thickness. It is one of the heat-shrinkable laminate films in a folded tubular form according to the present invention.

In the similar manner to that in Examples 1 to 4 except for using the combination of the resins shown in Table 1, two kinds of the laminate films were prepared in Comparative Examples 1 to 2. The resins used in Examples 1 to 4 and Comparative Examples 1 to 2 are shown in Table 1-1. Table 2 shows the methods for determining the properties of the thus prepared laminate films, and Tables 1-2 and 1-3 shows the layer-construction and the physical properties of the thus prepared laminate films.

TABLE 1-1

Physical Properties of Resins:

| Resin | Density (g/ml) | Melt index (g/10 min) | Melting point (°C.) | Remarks |
|---|---|---|---|---|
| VDC[1] | — | — | — | |
| Ionomer (Io) | 0.95 | 2.8 | 90 | Made by Mitsui Polychemical Co. |
| LLDPE | 0.922 | 2.5 | 122 | Made by Mitsui petrochem. Co. |
| EVA-1 | 0.93 | 1.1 | 96 | Content of vinyl acetate unit of 5.5% |
| EVA-2 | 0.93 | 1.5 | 91 | Content of vinyl acetate unit of 10% |
| EVA-3 | 0.94 | 0.6 | 82 | Content of vinyl acetate unit of 15% |
| EEA[2] | 0.94 | 6 | — | Content of ethyl acrylate unit of 18% |

Notes:
[1] A resin composition comprising of 100 parts of a copolymer of vinylidene chloride and vinyl chloride in weight ratio of 80:20 and 1 part of epoxidized soybean oil.
[2] A copolymer of ethylene and ethyl acrylate used as the adhesive resin

Table 2

Method for Determination of Physical Properties of the laminate films

1. Heat-shrinkage in Hot water:

After immersing a specimen (10 cm square) of each of the laminate films at a relaxed state thereof in hot water at 90° C. for one min, the percentage of the length to the original length and the percentage of the width to the original width are shown, respectively as the averaged values of the test data on 20 specimens.

2. Gas-barrier property (permeability to gaseous oxygen): The volume of gaseous oxygen permeated through a specimen of each of the laminate films at 30° C. and relative humidity of 100%, respectively as the averaged values of the test data on 20 specimens.

TABLE 1-2

Layer Construction of Laminate Films

| Example or Comparative Example | 1st layer | 2nd layer | 3rd layer | 4th layer | 5th layer | 6th layer | 7th layer | 8th layer | 9th layer | Temperature of Hot-water bath (°C.) |
|---|---|---|---|---|---|---|---|---|---|---|
| Example 1 | EVA-3 (12) | EEA (1) | VDC (8) | EEA (1) | Io (10) | EEA (1) | EVA-3 (27) | | | 85 |
| Example 2 | LLDPE (10) | EEA (1) | VDC (8) | EEA (1) | Io (10) | EEA (1) | EVA-2 (29) | | | 95 |
| Example 3 | MIX-1[1] (12) | EEA (1) | Io (5) | EEA (1) | VDC (8) | EEA (1) | Io (5) | EEA (1) | EVA-1 (26) | 92 |
| Example 4 | MIX-1[1] (12) | EEA (1) | Io (5) | EEA (1) | VDC (8) | EEA (1) | Io (5) | EEA (1) | MIX-2[2] (26) | 93 |
| Comparative Example 1 | EVA-2 (15) | EEA (1) | VDC (8) | EEA (1) | EVA-2 (35) | | | | | 93 |
| Comparative Example 2 | EVA-3 (15) | EEA (1) | VDC (8) | EEA (1) | EVA-3 (35) | | | | | 90 |

Notes:
[1] MIX-1: Mixture of LLDPE and EVA-1 in a weight ratio of 3:7.
[2] MIX-2: Mixture of LLDPE and EVA-1 in a weight ratio of 2:8.

TABLE 1

Physical Properties of Laminate Films

| Example or Comparative Example | Stretchability | Rigidity | Heat-shrinkage (%) longitudinal | Heat-shrinkage (%) transversal | Gas-barriering property (ml/m² · day · atom) |
| --- | --- | --- | --- | --- | --- |
| Example 1 | Excellent | Excellent | 53 | 56 | 52 |
| Example 2 | Excellent | Excellent | 42 | 43 | 52 |
| Example 3 | Excellent | Excellent | 47 | 50 | 52 |
| Example 4 | Excellent | Excellent | 45 | 48 | 52 |
| Comparative Example 1 | Poor | Inferior | 42 | 46 | 52 |
| Comparative Example 2 | Inferior | Poor | 50 | 53 | 52 |

Note:
Stretchability: Excellent means "particularly excellently stretchable with unevenness of the thickness of less than 30%". Inferior means "although stretchable, with unevenness of the thickness of 30 to 50%". Poor means "although stretchable, without steadiness and with unevenness of the thickness of more than 50%".
Rigidity: Excellent means "defects in packaging operation such as the elongatoin of the film due to the content scarcely occur". Inferior means "defects in packaging operation occur occasionally". Poor means "defects in packaging operation are apt to occur".

As are seen clearly in Examples 1 to 4 in Table 1-3, the heat-shrinkable laminate film is excellent in stretchability and adequate in rigidity and accordingly, it is excellent in processability during the packaging operation.

On the other hand, although the rigidity of the film prepared in Comparative Example 1 is relatively favorable because of the use of EVA which is high in melting point, it is difficult to carry out a stable stretching while using the film. In addition, although the film prepared in Comparative Example 2 is relatively favorable in stretchability, it is poor in rigidity and accordingly, the processability thereof in the packaging operation is apt to become poor.

What is claimed is:

1. A heat-shrinkable laminate film comprising outer layers of a polyolefin, a gas-barrier layer of a copolymer of vinylidene chloride, at least one intermediate layer of an ionomer and adhesive layers disposed between any of the above layers, the total thickness of the intermediate layer(s) of an ionomer being 5 to 20% of the total thickness of the heat-shrinkable laminate film, and (i) at least one of the outer layers being a copolymer of ethylene and vinyl acetate of a crystal melting point in a range of from 80° to 103° C. and another outer layer being a linear, low density polyethylene of a crystal melting point in a range of from 110° to 130° C. or a mixture of not more than 40% by weight of the linear, low density polyethylene and not less than 60% by weight of a copolymer of ethylene and vinyl acetate of a crystal melting point in a range of from 80° to 103° C., or (ii) each of the outer layers being a mixture of not more than 40% by weight of a linear, low density polyethylene of a crystal melting point in a range of from 110° to 130° C. and not less than 60% by weight of a copolymer of ethylene and vinyl acetate of a crystal melting point in a range of from 80° to 103° C.

2. A heat-shrinkable laminate film according to claim 1, wherein a total thickness of the heat-shrinkable laminate film is in a range of from 20 to 120 micrometers, a thickness of the gas-barrier layer is more than 2 μm and not more than 30% of the total thickness of the heat-shrinkable laminate film, a thickness of the outer layer is in the range of 35 to 92% of the total thickness of the heat-shrinkable laminate film, a thickness of the intermediate layer(s) of an ionomer is in the range of 5 to 20% of the total thickness of the heat-shrinkable laminate film, and a thickness of each of adhesive layers is 0.5 to 3.0 μm.

3. A heat-shrinkable laminate film according to claim 1, wherein the heat-shrinkable laminate film is a flat sheet form.

4. A heat-shrinkable laminate film according to claim 1, wherein the heat-shrinkable laminate film is a tubular form.

* * * * *